Jan. 3, 1933. E. J. LUSH 1,892,732
HYDROGENATING APPARATUS
Filed May 21, 1930

INVENTOR
Ernest J. Lush
BY
Wilkinson & Mawhinney
ATTORNEYS.

Patented Jan. 3, 1933

1,892,732

UNITED STATES PATENT OFFICE

ERNEST JOSEPH LUSH, OF LONDON, ENGLAND

HYDROGENATING APPARATUS

Application filed May 21, 1930, Serial No. 454,493, and in India May 28, 1929.

The hydrogenation of liquids, solids in suspension and gases by the use of catalysts prepared according to the specification of United States Patent No. 1,519,035 has shown that the activity of the catalyst so prepared is especially great qualitatively allowing hydrogenation reactions to be carried out at lower temperatures than hitherto economically possible. The activity of the catalyst is quantitatively proportional to the anodically oxidized surface of the metallic mass.

It is therefore important in practice to obtain the maximum surface in a given space represented by the capacity of the reaction vessel and to have the metal wire, turnings, plates or other metallic elements in such a form as to obtain the maximum catalytic activity by anodic oxidation.

Now I have found that if wire, turnings or other metallic elements be packed into cylindrical tubes of perforated material, such as metallic gauze of varying diameters, that since anodic oxidation commences at the surface of the anode nearest the cathode there is a maximum diameter of the cylindrical reticulated mass of metal wire or the like which can be conveniently penetrated and oxidized. As a matter of fact if the cylindrical mass of turnings or the like has a diameter of 6 inches or less all portions of the mass have equal activity. If, however, the diameter of the cylindrical mass of turnings or the like is 12 inches then if three portions of catalysts be taken at regular intervals or distances between the outside and the centre of the mass the activity of the three portions will be as 100:100:80 respectively. It will be seen therefore that a mass of turnings or wire should be anodically oxidized so that the distance between the inner and outer core of the turnings does not exceed 6 inches.

On the other hand it is important to use such a form of catalyst as will require the minimum amount of handling since handling involves cost, loss by disintegration and increased danger of decrease of activity of catalyst due to the adventitious contamination of the turnings or other metallic elements.

The object of the present invention is to provide various forms of compact reticulated catalytic masses which will give greater industrial efficiency to the process described in the specification of Patent No. 1,519,035, taking into consideration the conditions set out above.

In the annexed drawing is diagrammatically illustrated two alternative arrangements and dispositions of catalytic elements within an ordinary reaction vessel.

Figure 1:
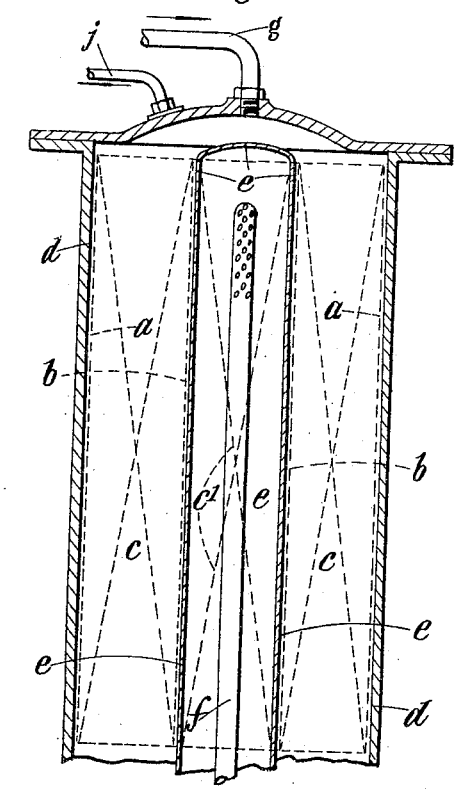

In Figure 1 is shown one form wherein the catalytic mass of nickel turnings is packed between two wire gauze cylinders $a$ and $b$ and diameters of which are respectively 18 inches and 6 inches.

For the purpose of carrying out the oxidizing process a cathode sheet can be used to surround the cylinder $a$ and a cathode rod or tube can be placed centrally inside the cylinder $b$ so that the greatest distance the oxidation has to travel back from the outside edge nearest the cathode is 3 inches. In this arrangement the annular space occupied by the catalytic mass $c$ contained within the cylinders $a$ and $b$ amounts to about 89 per cent of the total area available within the reaction vessel $d$ which is also presumed to be cylindrical. It will be appreciated that within the tube or cylinder $b$ of the annular catalytic mass $c$ may be placed another cylindrical catalyst $c'$ made up of wire or turnings separately oxidized so as to completely fill the reaction vessel $d$.

In practice however it is found more useful and convenient to utilize this space by the insertion of the closed stand-pipe $e$ which contains the upstanding steam pipe $f$ which is perforated at its top so as to serve as heating means for the contents of the reaction vessel $d$.

The supply of the material to be subjected to hydrogenation is admitted by the conduit $g$ and discharged from the reaction vessel $d$ by the pipe $h$, whilst the hydrogen enters the reaction vessel by the pipe $i$ and escapes by the pipe $j$ thus constituting a counterflow as usually practised in such processes. $k$ is the pipe by which steam is admitted to the interior stand pipe $e$ and another pipe $m$ serves for drainage of condense or steam exit.

It may be observed that the cage within which the turnings forming the reticulated catalytic mass is packed approximately occupies one-third of the reaction vessel so that merely three elements would be required in the example illustrated in Figure 1.

Figure 2:
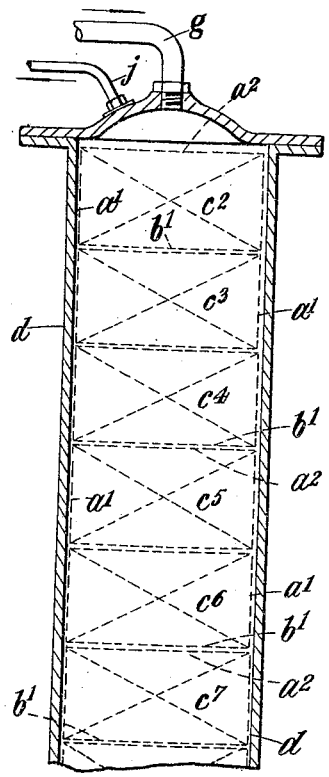
Figure 2:
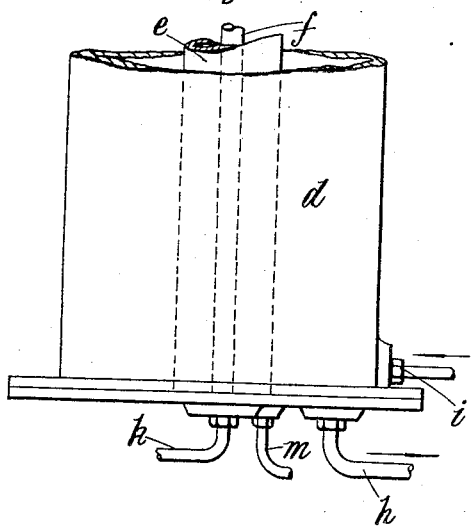
Figure 2:
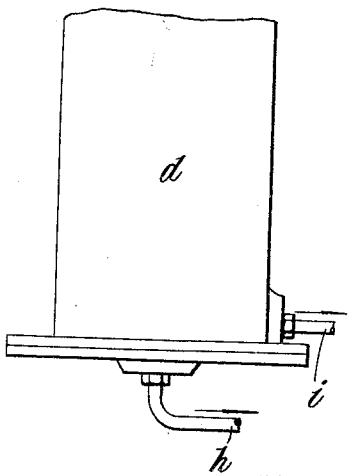

In Figure 2 the reaction vessel $d$ is of tubular construction each of the catalytic elements $c^2$, $c^3$, $c^4$, $c^5$, $c^6$ and $c^7$, being composed of the metallic gauze vertical wall $a'$ with top disc $a^2$ and bottom disc $b^1$ so that presuming the height or thickness does not exceed 6 inches when the element is suspended in the electrolytic bath the anodic oxidation penetrates from the surfaces $a^2$ and $b^1$ towards the centre so that the oxidation merely traverses from the cathode on either side of the element 3 inches towards the centre of the reticulated mass.

It will be understood that such plain block-like elements occupy considerably less space and need very much less handling than plates or discs superposed in like manner as referred to in specification of Patent No. 1,519,035.

In either of the foregoing examples the metallic gauze cylinder within which the reticulated catalytic mass is packed it is advantageous to employ gauze or perforated sheeting made of alloys which will not have a deleterious action on the catalytic process and are more resistant to anodic oxidation than the metal forming the catalyst.

For example a cylindrical metallic gauze or sheet composed of a copper or a copper nickel alloy, or other acid resisting metal, may be used to contain the turnings or wire of pure nickel. It may be observed that metallic wire as for example nickel may be used in such a form that no retaining gauze cage is necessary.

Again in highly exothermic reactions it has been found advantageous to employ thicker wire or coarser turnings so that a sudden change in temperature is avoided by the relatively high heat capacity of the catalytic mass. When the heat of reaction is exceptionally high as in the hydrogenation of nitro-benzene to aniline it is convenient to replace the wire by tubes through which a liquid is circulated to control the temperature the exterior surface of the tubes being anodically oxidized and subsequently reduced in hydrogen to produce a catalytic surface.

What I claim is:—

1. In hydrogenating apparatus, a reaction vessel, a plurality of cylindrical tubular cages of acid resisting metal within said vessel, each of said tubular cages containing pure nickel turnings forming a compact reticulated catalytic element and each of such elements not materially exceeding six inches in thickness, said elements being anodically oxidized preparatory to their use in said hydrogenating vessel.

2. In hydrogenating apparatus, a reaction vessel, a plurality of circular cages of acid resisting metal disposed within said vessel, each of said cages containing pure nickel turnings forming a compact reticulated catalytic element and each of such elements not materially exceeding six inches in thickness said elements being anodically oxidized preparatory to their use in said hydrogenating vessel.

3. In hydrogenating apparatus, a reaction vessel, a plurality of tubular elements disposed within said vessel and forming a heating means, the exterior surface of said elements being anodically oxidized and subsequently reduced in hydrogen to produce an activated catalytic surface, in combination with known means for admitting the material to be hydrogenated to said vessel and the discharge therefrom in a counter-flow direction to the hydrogen passing through said vessel.

In testimony whereof I affix my signature.

ERNEST JOSEPH LUSH.